UNITED STATES PATENT OFFICE.

BRUNO RICHARD SEIFERT, OF RADEBEUL, GERMANY, ASSIGNOR TO THE CHEMISCHE FABRIK VON HEYDEN, GESELLSCHAFT MIT BESCHRANKTER HAFTUNG, OF SAME PLACE.

ISOHOMOVANILLIN.

SPECIFICATION forming part of Letters Patent No. 575,070, dated January 12, 1897.

Application filed June 6, 1896. Serial No. 594,597. (Specimens.)

*To all whom it may concern:*

Be it known that I, BRUNO RICHARD SEIFERT, of Radebeul, near Dresden, in the Kingdom of Saxony, German Empire, have invented and produced a new Group of Aromatic Substances, of which the following is a specification.

Homovanillins have been produced which differ from vanillin $$C_6H_3 \begin{matrix} COH & 5 \\ OCH_3 & 1 \\ OH & 2 \end{matrix}$$

in this, that they contain instead of the group $OCH_3$ the homologous groups $OC_2H_5$, $OC_3H_7$, &c.

These known homovanillins have the general formula $$C_6H_3 \begin{matrix} COH \\ OC_nH_{2n+1} \\ OH \end{matrix}$$

I have produced and my invention consists in a hitherto-unknown group of aromatic substances differing from the above homovanillins, and which may be termed "isohomovanillins."

While the vanillin and the homovanillins may be considered as being ethers of the protocatechinaldehyde, $$C_6H_3 \begin{matrix} COH \\ OH \\ OH, \end{matrix}$$

the new isohomovanillins must be looked at as ethers of the homoprotocatechinaldehyde

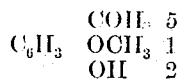

$$C_6H_2 \begin{matrix} CH_3 \\ COH \\ OH \\ OH. \end{matrix}$$

My new aromatic substances have the general formula

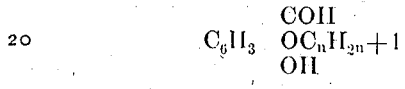

$$C_6H_2 \begin{matrix} OC_nH_{2n+1} & 1 \\ OH & 2 \\ CH_3 & 4 \\ COH & 5, \end{matrix}$$

in which the general group $C_nH_{2n+1}$ may be replaced by the special groups $CH_3$ and $C_2H_5$.

The isohomovanillins have an extremely permanent smell or scent similar to vanillin, but distinctly differing from the same. They are easily soluble in soda-lye and in ether and more difficultly soluble in alcohol. They crystallize out of hot alcohol in colorless or yellowish scales and needles.

The isohomovanillin

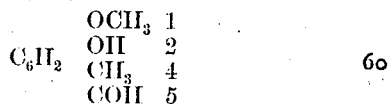

$$C_6H_2 \begin{matrix} OCH_3 & 1 \\ OH & 2 \\ CH_3 & 4 \\ COH & 5 \end{matrix}$$

melts at 165° centigrade, the ethylisohomovanillin

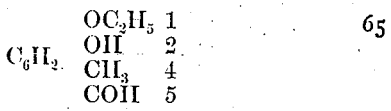

$$C_6H_2 \begin{matrix} OC_2H_5 & 1 \\ OH & 2 \\ CH_3 & 4 \\ COH & 5 \end{matrix}$$

at 91° centigrade. These isohomovanillins may be produced in different ways—for instance, by the action of chloroform on isohomopyrocatechinether of the formula

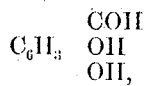

$$C_6H_3 \begin{matrix} OC_nH_{2n+1} & 1 \\ OH & 2 \\ CH_3 & 4 \end{matrix}$$

or also in another manner.

From the isocreosol, for example, described by Tiemann and Koppe, *Berichte der Deutschen Chemischen Gesellschaft* 14, page 2,025,

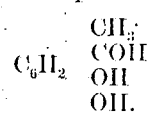

$$C_6H_3 \begin{matrix} OCH_3 & 1 \\ OH & 2 \\ CH_2 & 4 \end{matrix}$$

the isohomovanillin is obtained in the following manner: Ten kilograms of isocreosol are dissolved in thirty kilograms of soda-lye, of which each kilogram contains four hundred and thirty grams of sodiumhydroxid, and in thirty-seven kilograms of water. Into this solution, which is heated in the water-bath, fifty kilograms of chloroform are caused to flow. After the latter has been consumed by the reaction the solution is allowed to cool down and treated with diluted muriatic acid and extracted with ether. From this ether solution the aromatic substance is extracted by means of a solution of bisulfite of sodium. By the addition of acid the bisulfite compound is decomposed. The aromatic substance thus liberated separates in solid form. It is withdrawn by means of filtration and purified by recrystallization out of alcohol.

If instead of isocreosol the equivalent quantity of the ethylhomopyrocatechin $$C_6H_3 \begin{array}{ll} OC_2H_5 & 1 \\ OH & 2 \\ CH_3 & 4 \end{array}$$

is used, the ethylisohomovanillin $$C_6H_2 \begin{array}{ll} OC_2H_5 & 1 \\ OH & 2 \\ CH_3 & 4 \\ COH & 5 \end{array}$$

is obtained. The proportions of concentration and of quantity mentioned in this example may vary within wide limits, and instead of the soda-lye other alkalies or earth alkalies may be employed, also instead of water other dissolving liquids.

What I claim as my invention is—

The new aromatic substances obtained from isocreosol and similar bodies and herein termed "isohomovanillins" of the formula $$C_6H_2 \begin{array}{ll} OC_nH_{2n+1} & 1 \\ OH & 2 \\ CH_3 & 4 \\ COH & 5 \end{array}$$

whereby the general group $C_nH_{2n+1}$ is limited to the special cases $CH_3$ and $C_2H_5$, the said isohomovanillins being soluble in soda-lye, ether and alcohol, forming colorless or yellowish scales and needles and being especially characterized by a vanilla-like scent and taste.

In testimony that I claim the foregoing as my invention I have signed my name in presence of two subscribing witnesses.

BRUNO RICHARD SEIFERT.

Witnesses:
HERNANDO DE SOTO,
PAUL ARRAS.